United States Patent [19]
Hall

[11] Patent Number: 4,981,035
[45] Date of Patent: Jan. 1, 1991

[54] DUST DEFELECTOR FOR SILICON MASS AIRFLOW SENSOR

[75] Inventor: Bryan C. Hall, Newport News, Va.

[73] Assignee: Siemens Automotive L.P., Troy, Mich.

[21] Appl. No.: 474,429

[22] Filed: Feb. 2, 1990

Related U.S. Application Data

[63] Continuation-in-part of Ser. No. 390,574, Aug. 7, 1989, abandoned.

[51] Int. Cl.[5] .............................. G01P 5/00; G01F 5/00
[52] U.S. Cl. ..................................... 73/118.2; 73/202; 73/204.21
[58] Field of Search .................. 73/202, 202.5, 204.21, 73/204.22, 204.26, 118.2

[56] References Cited

U.S. PATENT DOCUMENTS

| | | | |
|---|---|---|---|
| 4,304,130 | 12/1981 | Peter et al. | 73/204.26 |
| 4,412,419 | 11/1983 | Eiermann et al. | 73/204.21 |
| 4,785,662 | 11/1988 | Ohta et al. | 73/204.21 |
| 4,856,328 | 8/1989 | Johnson | 73/204.21 X |

FOREIGN PATENT DOCUMENTS

| | | | |
|---|---|---|---|
| 0190624 | 10/1984 | Japan | 73/204.21 |
| 0227124 | 11/1985 | Japan | 73/204.21 |
| 0031964 | 2/1986 | Japan | 73/204.26 |

OTHER PUBLICATIONS

Huijsing et al., "Monolithic Integrated Direction-Sensitive Flow Sensor", in IEEE Trans., vol. 29, No. 1/82, pp. 133-136.

*Primary Examiner*—Herbert Goldstein
*Attorney, Agent, or Firm*—George L. Boller; Russel C. Wells

[57] ABSTRACT

The silicon sensing element of a mass airflow sensor is shielded from direct impact by large dust particles by means of a plastic deflector that is disposed in spaced upstream relationship to the entrance of a by-pass venturi containing the sensor. The deflector is supported on a mesh screen and is arranged such that air can enter the by-pass venturi after having passed by and behind the deflector. In another embodiment the deflector is an airfoil that is part of a probe assembly containing the sensing element.

14 Claims, 2 Drawing Sheets

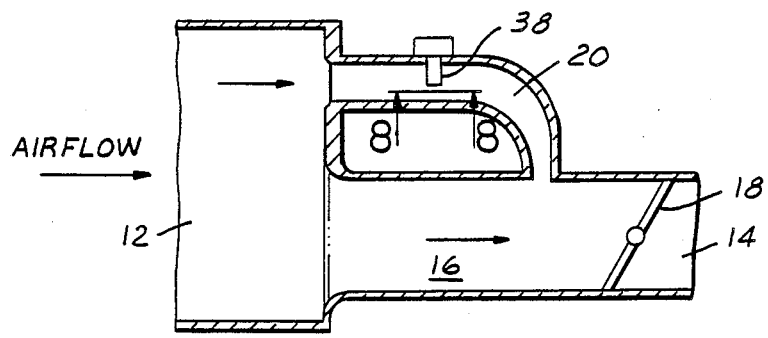
FIG. 7
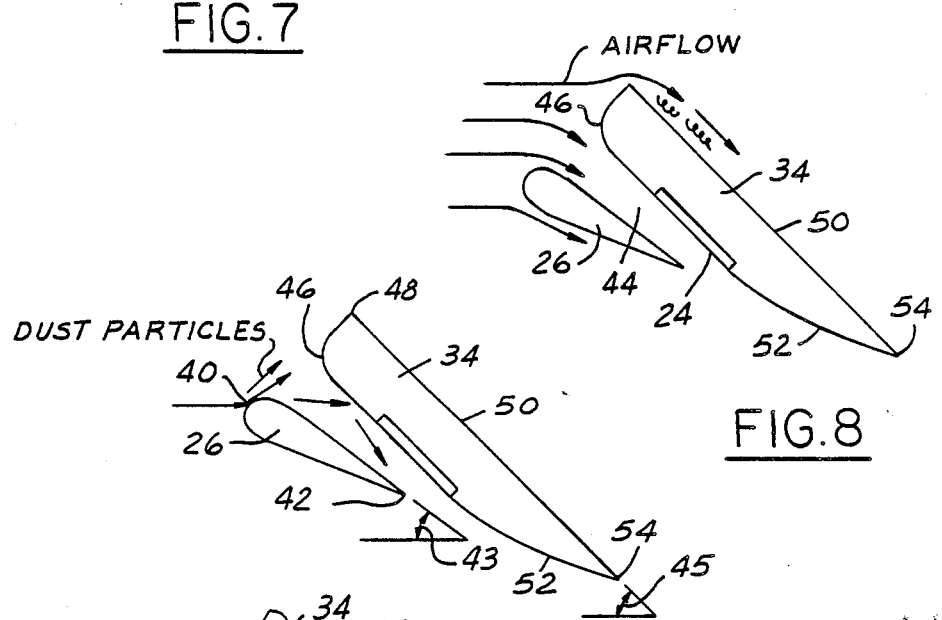
FIG. 8
FIG. 9
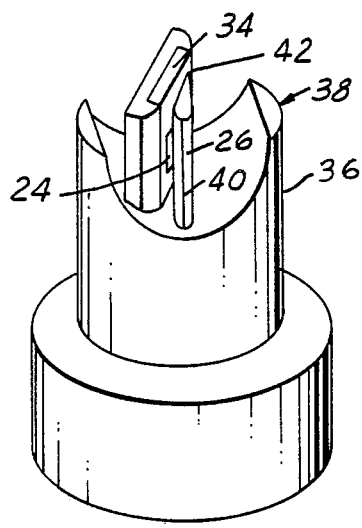
FIG. 10

4,981,035

DUST DEFELECTOR FOR SILICON MASS AIRFLOW SENSOR

REFERENCE TO A RELATED APPLICATION

This is a continuation-in-part of pending application Ser. No. 07/390,574, filed Aug. 7, 1989, now abandoned.

BACKGROUND AND SUMMARY OF THE INVENTION

This invention relates to mass airflow sensors that are used in airbodies of internal combustion engines.

In state-of-the-art electronically controlled fuel systems for automotive internal combustion engines, the measurement of airflow that is inductd into the engine's intake system is an input to the engine electronic control unit (ECU). One way of obtaining this measurement is by means of a mass airflow sensor located in a by-pass venturi in the airbody. In order to be acceptable, a mass airflow sensor must be able to pass a required dust test. For example, the sensor must be able to withstand a certain number of hours of dust flow at a certain number of grams of dust per hour. One problem is that a silicon mass airflow sensor is very susceptible to damage from dust particles traveling at high rates of speed.

The present invention provides a solution to this problem so that the potential for damage due to dust that is entrained in the airflow is significantly lessened. The solution comprises a deflector, or shield, that is placed upstream of the sensor and functions to shield the sensor from direct impact by large particles of dust, yet allowing smaller, less damaging particles to flow over the sensor. The placement of the deflector still allows the sensor to operate in an accurate manner for measuring airflow. The deflector is easy to fabricate and to assemble to the airbody so that it is quite cost-effective.

Other features and advantages of the invention, along with those just mentioned, will be seen in the ensuing description and claims which should be considered in conjunction with the accompanying drawings. The drawings disclose a preferred embodiment of the invention according to the best mode contemplated at the present time for carrying out the invention.

BRIEF DESCRIPTION OF THE DRAWINGS

FIG. 7 is sectional view similar to FIG. 1 illustrating another embodiment.

FIG. 8 is a fragmentary view on an enlarged scale taken in the direction of arrows 8—8 in FIG. 7, and schematically indicating flow.

FIG. 9 is a view like FIG. 8 but schematically illustrating another aspect of performance.

FIG. 10 is a perspective view on an enlarged scale of a portion of the embodiment of FIG. 7.

DESCRIPTION OF THE PREFERRED EMBODIMENT

Figure 1:
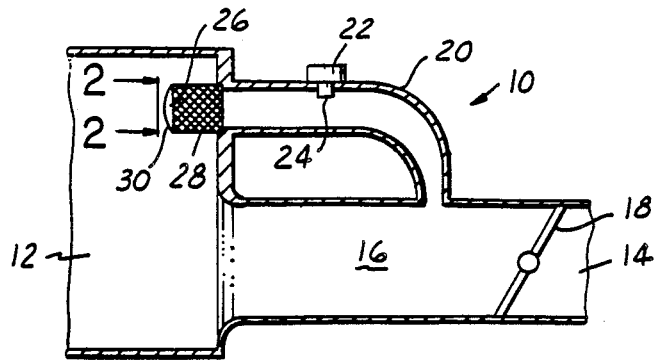
FIG. 1 is a longitudinal cross sectional view of a somewhat schematic nature through an airbody embodying principles of the invention.
Figure 2:
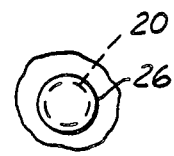
FIG. 2 is a view looking in the direction of arrows 2—2 in FIG. 1.

Reference is first made to the embodiment of FIGS. 1 and 2 which comprises an airbody 10 containing an entrance end 12 and an exit end 14. The main airflow path 16 includes a throttle blade 18 that is operated to selectively restrict the airflow through the airbody. A by-pass venturi 20 is in parallel with path 16 upstream of throttle blade 18. By-pass venturi 20 contains a mass airflow sensor 22 for measuring the airflow through by-pass venturi 20. The flow through the by-pass venturi is representative of the total flow through the airbody, and therefore the measurement provided by sensor 22 is representative of total airflow into the engine. Actual sensing of airflow is performed by an unshielded silicon sensing element 24 that is exposed directly to the airflow through the by-pass venturi. It is this sensing element that is susceptible to impact damage by larger dust particles that are entrained in the airflow entering the by-pass venturi.

The potential for damage to sensing element 24 is reduced by incorporation of a deflector, or shield, 26 into the airbody. Deflector 26 is an imperforate disc having a circular shape. It is supported in spaced upstream relation to the entrance to by-pass venturi 20 by means of a cylindrically shaped, perforate support 28 which may be a wire mesh screen. The screen is arranged axial to the by-pass venturi entrance, and its open upstream end is closed by the deflector. In this way the deflector confronts and covers the entrance to the by-pass venturi when viewed in the direction from which air enters the airbody. Yet air is allowed to enter the by-pass venturi after flowing past and behind the deflector. It is deemed desirable for the upstream face 30 of deflector 26 to be convexly shaped, as illustrated.

The deflector functions to shield sensing element 24 from direct impact by particles entering the airbody while allowing airflow to pass through the by-pass venturi. Sensor 22 is able to provide an accurate measurement of the flow through the by-pass venturi, and flow through the by-pass remains correlated with the total flow through the air body so that accuracy of the measured airflow can still be attained.

Figure 3:
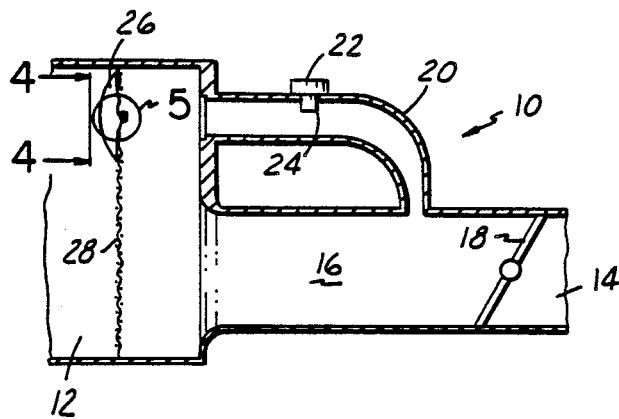
FIG. 3 is a view similar to the view of FIG. 1, but of another embodiment.
Figure 4:
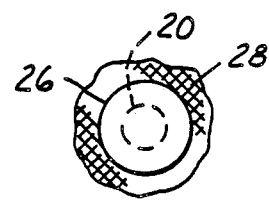
FIG. 4 is a view looking in the direction of arrows 4—4 in FIG. 3.
Figure 5:
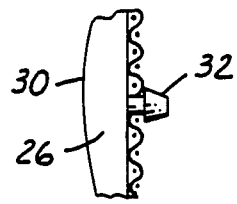
FIG. 5 is an enlarge view in circle 5 of FIG. 3.

The embodiment portrayed by FIGS. 3 and 4 is like the embodiment of FIGS. 1 and 2 except for the details of the deflector and its mounting. The deflector 26 of FIGS. 3 and 4 is slightly larger in diameter than that of FIGS. 1 and 2, and the perforate support 28 for the deflector is a wire mesh screen that is disposed transverse to the direction of flow, covering the entrances to both the main path 16 and the by-pass venturi 20.

A convenient way to attach the deflector to the screen is by fabricating the deflector from molded plastic and including a centrally located dart 32 on the flat downstream face of the deflector. The dart is used to provided a snap-on attachment to the screen by passing through one of the screen's openings.

Figure 6:
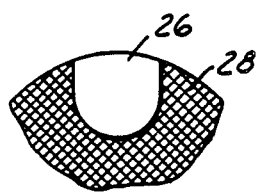
FIG. 6 is a view in the same direction as the views of FIGS. 2 and 4, but of still another embodiment.

FIG. 6 illustrates an alternate shape for the deflector wherein the deflector has a generally U-shape, as viewed from the direction of airflow into the airbody. It is contemplated that shapes other than those specifically disclosed herein can be satisfactorily used in the practice of the invention. Also contemplated are other means of fabrication and attachment. For example, the use of tape for the deflector is one possibility.

FIG. 7 shows an airbody of generally similar configuration to that of FIG. 1, and therefore corresponding parts are designated by like reference numerals. The differences between the embodiment of FIG. 7 and that of FIG. 1 involve the deflector 26 and the mounting of the deflector and the silicon mass airflow sensing element 24.

Referring also to FIGS. 8–10, deflector 26 is in the form of an airfoil, and sensing element 24 is mounted on a mount member 34. The deflector and sensing element are disposed on a circularly-flanged base 36 that mounts in a suitable opening in the wall of the by-pass. These components 24, 26, 34, 36 form a probe assembly 38 that projects transversely into the by-pass when installed on the airbody. Electric circuit connections (not shown) for sensing element 24 are routed through mount member 34 and base 36.

The airfoil-shaped deflector 26 is spaced upstream of member 34, and the airfoil's leading edge 40 is disposed upstream relative to its trailing edge 42. The airfoil is arranged to have a certain acute angle of attack 43 relative to the direction of airflow. Sensing element 24 is disposed to lie in the shadow cast by deflector 26 from the direction from which the airflow approaches the deflector. In this way, those particulates that are entrained in the airflow and would otherwise directly impact on sensing element 24, directly impact the deflector instead, and hence do not make direct impact with the sensing element.

The cooperative effect of deflector 26 with sensing element 24 and member 34 is such that a portion of the airflow through the by-pass is caused to flow in the channel 44 created between the deflector and the mounting member and thereby pass over the flush-mounted sensing surface of the sensing element. The flow through channel 44 is representative of the by-pass flow, and hence representative of the airflow through the airbody, over a wide range of flows.

As perhaps best seen in FIG. 9, the sensing element's exposed face is disposed at an acute angle 45 to the direction of flow toward the deflector that is greater than the airfoil's angle of attack. While each of these two angles 43, 45 is susceptible to some variation from one probe design to another, a representative angle of attack for the airfoil-shaped deflector is about 15 degrees and a representative angle for disposition of the face of the sensing element is about 30 degrees.

Member 34 has a rounded leading surface 46 that is spaced upstream of the sensing element and faces the direction of flow toward the airfoil. This surface terminates at an edge 48. A flat downstream surface 50 of member 34 extends from edge 48 in generally parallel relationship to the flush-mounted sensing face of the sensing element on the opposite side of the mount member. The trailing portion of the sensing-element-containing side comprises a narrowing taper 52 that begins at a location downstream of the sensing element and continues to a trailing edge 54 where it meets the trailing edge of surface 50.

FIGS. 8 and 9 schematically depict the airflow and dust particle deflection characteristics. It can be seen that direct impacting of the sensing element by particulates is prevented. Larger particles will typically be carried around the probe so that they do not even pass through channel 44. While smaller particles may pass through the channel, they, as well as an stray larger particles that pass through the channel will not directly impact the sensing element head-on. To the extent that any particle(s) may strike the sensing element, they will do so at an angle oblique angle. Thus probe 38 possesses improved dust-resistance and it is well-suited for convenient assembly to the airbody. It is to be understood of course that the inclusion of a screen over the airbody entrance may be desirable to preclude insertion of devices, such as tools, into the by-pass.

While a preferred embodiment of the invention has been disclosed, it should be understood that principles are applicable to other embodiments.

What is claimed is:

1. In an airbody for an automotive internal combustion engine wherein a fraction of the induction airflow through the airbody is conducted through a by-pass venturi that contains a mass airflow sensor having an unshielded sensing element disposed directly in the flow path, the improvement for reducing the potential for damage to the sensor due to the impact of air-entrained particulates with the unshielded sensing element, said improvement comprising a shield disposed in spaced upstream relation to said sensing element such that said sensing element is caused to lie in the shadow cast by said shield from the direction from which airflow approaches said shield so that particulates above a certain size that are entrained in the airflow approaching the shield are prevented by the shield from directly impacting the sensing element while the flow passing over said sensing element is caused to remain representative of the airflow through the airbody over a range of different airflows, in which said shield comprises an airfoil whose leading edge is disposed upstream relative to its trailing edge, and in which said airfoil is disposed at a given angle of attack and said sensing element is disposed in a plane that is at an angle greater than said angle of attack, as measured from the direction of flow toward said airfoil.

2. The improvement set forth in claim 1 in which said given angle of attack is approximately 15 degrees and said greater angle is approximately 30 degrees.

3. The improvement set forth in claim 1 in which said sensing element is disposed on a mount which has a rounded leading surface facing the direction of flow toward said airfoil, said sensing element being flush mounted in said mount at a location that is downstream of said rounded leading surface.

4. The improvement set forth in claim 1 in which said airfoil and said sensing element are mounted on a probe assembly that projects transversely into said bypass.

5. An airflow sensing probe for use in the measurement of mass airflow through a conduit wherein particulates are entrained in the airflow, said probe comprising a base, a mass airflow sensing element mounted on a member that projects away from said base, and a shield projecting away from said base in front of and in the same general direction as said member, said sensing element lying in the shadow cast by said shield from the direction from which airflow approaches said shield when the probe is in use, in which said shield comprises an airfoil whose leading edge is disposed upstream relative to its trailing edge when the probe is in use, and in which said airfoil is disposed at a given angle of attack and said sensing element is disposed in a plane that is at an angle greater than said angle of attack, as measured from the direction of flow toward said airfoil, when the probe is in use.

6. A probe as set forth in claim 5 in which said given angle of attack is approximately 15 degrees and said greater angle is approximately 30 degrees.

7. An airflow sensing probe for use in the measurement of mass airflow through a conduit wherein particulates are entrained in the airflow, said probe comprising a base, a mass airflow sensing element mounted on a member that projects away from said base, and a shield projecting away from said base in front of and in the same general direction as said member, in which said shield comprises an airfoil whose leading edge is disposed upstream relative to its trailing edge when the probe is in use, said sensing element lying in the shadow cast by said shield from the direction from which airflow approaches said shield when the probe is in use, in which said member has a rounded leading surface facing the direction of flow toward said airfoil when the probe is in use, said sensing element being flush mounting in said member at a location that is downstream of said rounded leading surface when the probe is in use, and in which said member has a taper that is disposed downstream of said sensing element.

8. In an airbody for an automotive internal combustion engine wherein a fraction of the induction airflow through the airbody is conducted through a by-pass venturi that contains a mass airflow sensor probe which disposes an unshielded sensing element directly in the flow path, the improvement for reducing the potential for damage to the sensing element due to the impact of air-entrained particulates with the unshielded sensing element, said improvement comprising means disposed in said by-pass venturi forming a channel through which flow representative of the airflow through the airbody over a range of different airflows passes, said channel-forming means comprising juxtaposed surface portions bounding opposite sides of said channel, said sensing element being flush-mounted on one of said surface portions, said surface portions being shaped upstream of said sensing element to form a tapered entrance throat for said channel, said tapered entrance throat and said channel being disposed such that the flow path therethrough is at an acute angle to the direction of approach of said airflow toward said channel-forming means, and said sensing element being disposed such that it cannot be directly impacted by particulates above a certain size that are entrained in the airflow approaching said channel-forming means.

9. The improvement set forth in claim 8 in which said channel-forming means comprises first and second members projecting into the by-pass venturi from a base of the sensor probe, said first of said members being disposed generally upstream of said second of said members relative to the direction of flow through the by-pass venturi, and said second of said members comprising said one surface portion.

10. In an airbody for an automotive internal combustion engine wherein a fraction of the induction airflow through the airbody is conducted through a by-pass venturi that contains a mass airflow sensor having an unshielded sensing element disposed directly in the flow path, the improvement for reducing the potential for damage to the sensor due to the impact of air-entrained particulates with the unshielded sensing element, said improvement comprising an imperforate shield confronting the entrance to the by-pass venturi and covering said entrance when viewed in the direction from which air enters the airbody, and means supporting said shield in spaced upstream relation to said entrance such that airflow enters said entrance by flowing past and then behind said shield, in which said means supporting said shield comprises a screen.

11. The improvement set forth in claim 10 in which said screen is arranged axial to the by-pass venturi entrance.

12. The improvement set forth in claim 11 in which said screen is cylindrical in shape, said shield closing the end of said screen opposite said entrance.

13. The improvement set forth in claim 10 in which said screen is arranged transverse to the direction of airflow through said airbody.

14. The improvement set forth in claim 13 in which said shield has a centrally located dart which snaps into an opening in said screen.

* * * * *